United States Patent Office 3,600,335
Patented Aug. 17, 1971

3,600,335
MODIFIED POLYVINYL CHLORIDE FOAMS, PREPARATION THEREOF AND APPLICATIONS THEREFOR
Michio Fukushima, Suita-shi, and Motoshi Mitarai, Nishinomiya-shi, Japan, assignors to Nippon Gohsei Kagaku Kogyo Kabushiki Kaisha, Kita-ku, Osaka-shi, Japan
Filed Dec. 15, 1967, Ser. No. 690,789
Int. Cl. C08f 47/10, 29/24, 45/36
U.S. Cl. 260—2.5P
3 Claims

ABSTRACT OF THE DISCLOSURE

Colorless polyvinyl chloride foams of greatly enhanced softness and elasticity, and with greatly improved fineness and uniformity of cell distribution, are obtained by blending 30 to 150 parts by weight of the total amount of a vinyl acetate-ethylene copolymer with a vinyl acetate content of 30% to 80% by weight and a liquid plasticizer in the proportion of 3% to 60% by weight of the former in the total amount of both together with 100 parts by weight of a polyvinyl chloride resin and by heating the obtained resinous mixture to an elevated temperature at which the foaming agent so decomposes as to be foamed.

Polyvinyl chloride foams are usually produced by treating at an elevated temperature a composition consisting of a polyvinyl chloride resin, a liquid plasticizer such as dioctyl phthalate (DOP), dibutyl phthalate (DBP) or tricresyl phosphate (TCP) and a foaming agent so as to foam. The foams of polyvinyl chloride resin are useful in the various uses, because they are not expensive and have excellent ageing-resistance, low inflammability and good mechanical properties. There are, however, some difficulties in case a polyvinyl chloride resin modified only by the liquid plasticizer as mentioned above is employed to be foamed. The melt viscosity of said resin composition sharply depends on temperature, and it may considerably change even on a slight variation of temperature. Therefore, the obtained foam bodies may have the non-uniform cells and the bad appearance and touch, unless the foaming temperature is strictly adjusted in a very narrow range and the special foaming agent which is able to foam at a temperature in the narrow temperature range is employed.

It is an object of the present invention to provide the novel modified polyvinyl chloride foams having good properties.

It is another object of the invention to provide an improved process of preparing a polyvinyl chloride foam without any difficulty as described above.

It is a further object of the invention to provide some useful products prepared by using the modified polyvinyl chloride foams.

Still further objects of the invention will be apparent from the following description and claims.

It has now been found that the said objects of the present invention can be successfully attained by using for foaming the polyvinyl chloride resin modified by the vinyl acetate-ethylene copolymer as defined below together with a liquid plasticizer.

According to the present invention, because of the small variation of the melt viscosity of the polyvinyl chloride resins modified by the vinyl acetate-ethylene copolymer and a liquid plasticizer over a considerably wide temperature range, the adjustment of the foaming temperature becomes very easy, many kinds of foaming agents may be utilized and the obtained foams have uniform and fine cells, proper elasticity and softness and good appearance and touch.

The composition used to be foamed in this invention may be obtained by blending (A) a vinyl acetate-ethylene copolymer of a vinyl acetate content of 30 to 80% (by weight here and hereinafter) and (B) a liquid plasticizer with 100 parts (by weight here and hereinafter) of polyvinyl chloride resin, the total amount of the components (A) and (B) being 30 to 150 parts and the ratio of the component (A) to the total amount of the (A) and (B) components being 3 to 60%, together with a small amount of a foaming agent.

The vinyl acetate-ethylene copolymer as used in the present invention shuld be of a vinyl acetate content of 30 to 80%, and preferably 40 to 70%. If the proportion of vinyl acetate in the copolymer is higher than 80%, the softness and elasticity of the finally obtained foams will be low. If the proportion is lower than 30%, the copolymer has low compatibility with polyvinyl chloride resin and may cause some troubles such as the nonuniformity of cells and the roughness of the surface of the foams. The degree of polymerization of said copolymer is not limited but preferably more than about 500 in average. The copolymer may include those modified with any other copolymerizable monomer in the manner of copolymerization usually in a range of less than about 20% to the weight of the copolymer. As such monomer, acrylic acid, acrylic acid esters, methacrylic acid, methacrylic acid esters, acrylonitrile, crotonic acid, vinyl chloride, vinyl formate, vinyl propionate, vinyl stearate, etc. are illustrated.

The use of less than 30 parts or more than 150 parts of the total amount of the above mentioned copolymer and a liquid plasticizer to 100 parts of polyvinyl chloride resin gives too hard or too soft foams, respectively. In case the ratio of the copolymer to the total amount of the copolymer and a liquid plasticizer is less than 3% or more than 60%, the adjustment of the foaming temperature is troublesome or the compatibility of the copolymer with polyvinyl chloride resin is too poor, respectively.

As the above mentioned liquid plasticizer, any conventional plasticizer for polyvinyl chloride resin, for example, phthalic acid esters such as diocryl phthalate, dibutyl phthalate, dibutyl lauryl phthalate, diheptyl phthalate (DHP), diisodecyl phthalate, dilauryl phthalate, butyl benzyl phthalate and dimethyl glycol phthalate, aliphatic dibasic acid esters such as diocryl adipate (DOA), dioctyl azelate and dioctyl sebacate, phosphoric acid esters such as tricresyl phosphate, polyester type plasticizers and epoxy type plasticizers may be used.

As the foaming agent, organic and inorganic foaming agents such as azodicarbonamide, dinitroso pentamethylene tetramine, benzene sulfonyl hydrazide, oxy-bis-benzene sulfonyl hydrazide, diphenyl sulfone-3,3'-disulfonyl hydrazide, toluene sulfonyl hydrazide, sodium bicarbonate and calcium azide may be used. If necessary, various ordinary additives for polyvinyl chloride resin, for example, stabilizers such as salts of cadmium, calcium, barium, zinc, tin or lead with higher fatty acids and organic tin compounds, foaming promotors such as salicylic acid, phthalic acid, benzoic acid and urea derivatives, fillers, pigments and lubricants may be used.

The blending of the copolymer, a plasticizer, a foaming agent and any other additive with polyvinyl chloride resin may be carried out by using an ordinary mixer such as a ball mill, mixing roll mill, Banbury mixer, calender roll mill and extruder.

Thus obtained mixture may be molded into sheet or any other desired shape or laminated on a base such as paper, cloth, film, veneer, etc. through known molding or laminating methods such as calendering, extruding and casting, and then may be subjected to an elevated temperature so at which the foaming agent decomposes, as to be foamed. The foaming temperature depends on the kind of the foaming agent.

The foams of the present invention have fine, homogeneous and uniformly distributed cells and desired properties such as good elasticity, softness, touch and appearance and the foams are not colored by heating during the production or by ageing during storage or use. Therefore, it can be widely utilized in various uses, for example, as adiabatic materials, cushion materials, interior decoration materials, etc. It is particularly useful as artificial leathers or leathery sheets which are prepared by laminating or lining the foams on or with cloth or film, and may be used as bags, clothes, sofa-coverings and the like.

The foams of the present invention shall now be concretely explained, without any intention of limitation, with reference to the accompanying photographs submitted under M.P.E.P. 608.2 in lieu of drawings and examples in the following:

In the said photographs submitted in lieu of drawings.

All scales shown in these photographs are graduated in 1 millimeter.

EXAMPLE 1

In the proportion as shown in Table 1, a vinyl chloride resin of an average degree of polymerization of 1050, a vinyl acetate-ethylene copolymer of a vinyl acetate content of 60.8% and an average degree of polymerization of about 4300, DOP and DBP as liquid plasticizer, azodicarbon amide in an amount of 6 parts to 100 parts of the vinyl chloride resin as foaming agent, and 1 part of a mixture of zinc stearate, cadmium stearate and barium stearate and 0.5 part of dibutyl tin dilaurate as stabilizer were passed through a calender roll mill as to be mixed and kneaded at a roll temperature of 150° C. for 5 minutes, and were laminated on cloth, and then the laminated cloth was heated to foam in an air oven at the temperature of 180, 190 or 200° C. for 4 minutes in each case.

In Control 1, the above mentioned experiment was repeated with the exception that vinyl acetate-ethylene copolymer was not employed.

The properties of thus obtained foams are shown in Table 1.

TABLE 1

Figure 1:
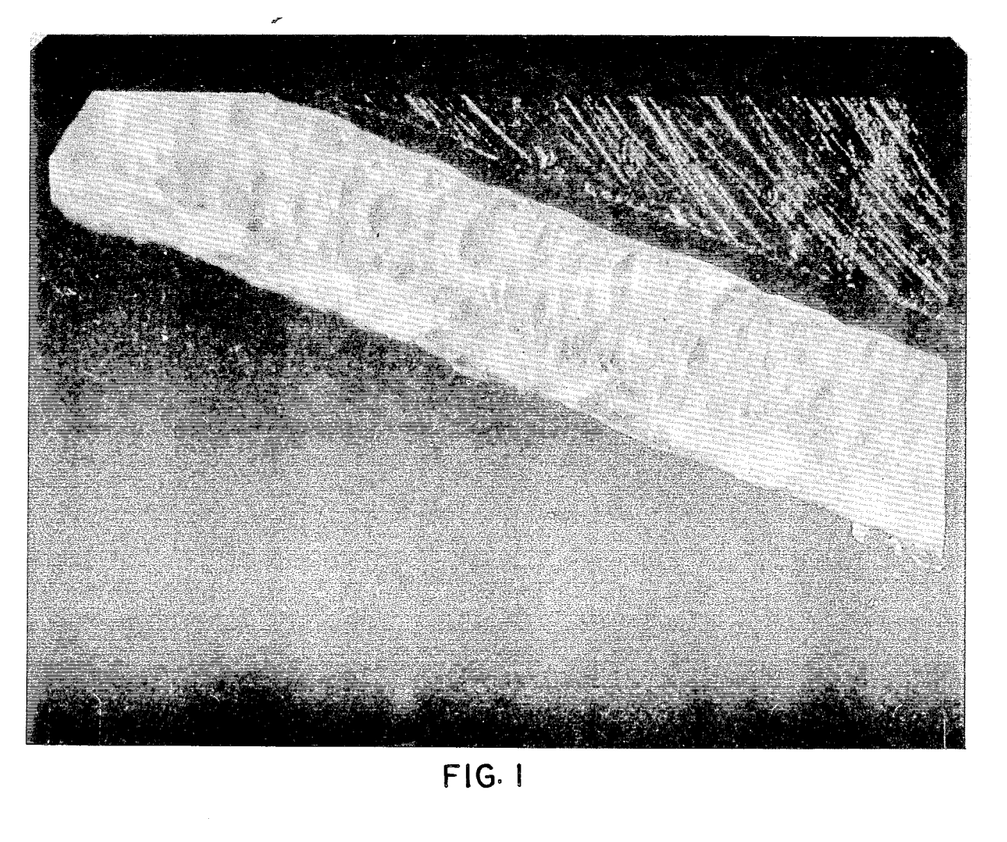
FIGS. 1 to 3 and 7 to 9 are microscopic photographs showing cells of the cross-sections of foams prepared by blending the vinyl acetate-ethylene copolymer according to the present invention.
Figure 2:
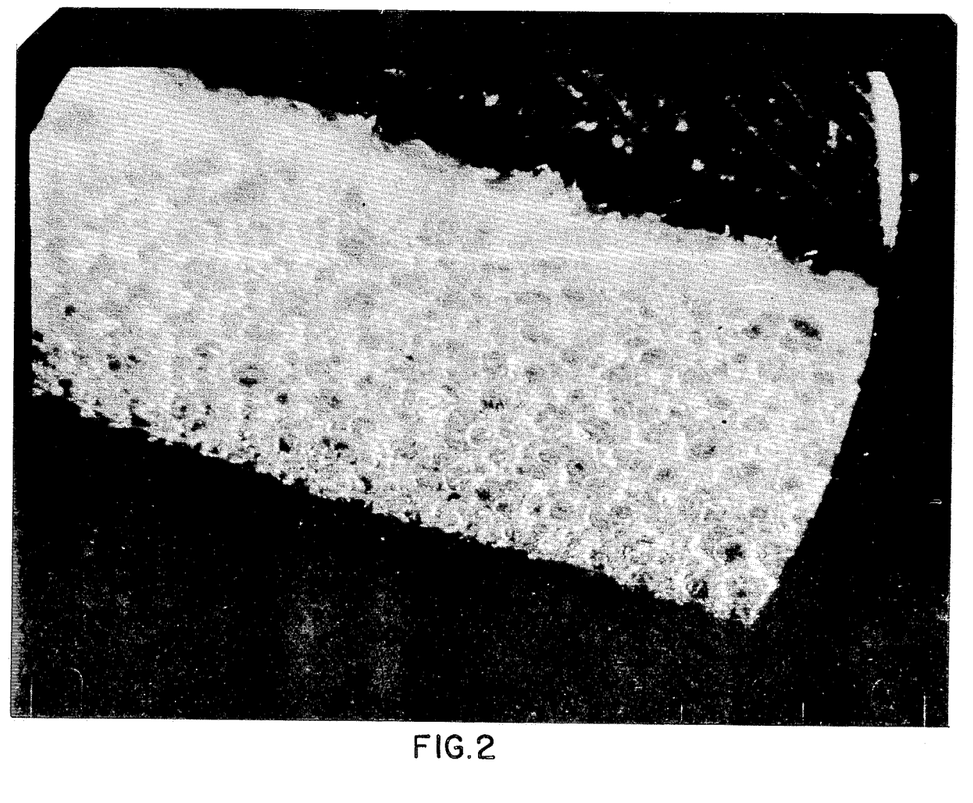
Figure 3:
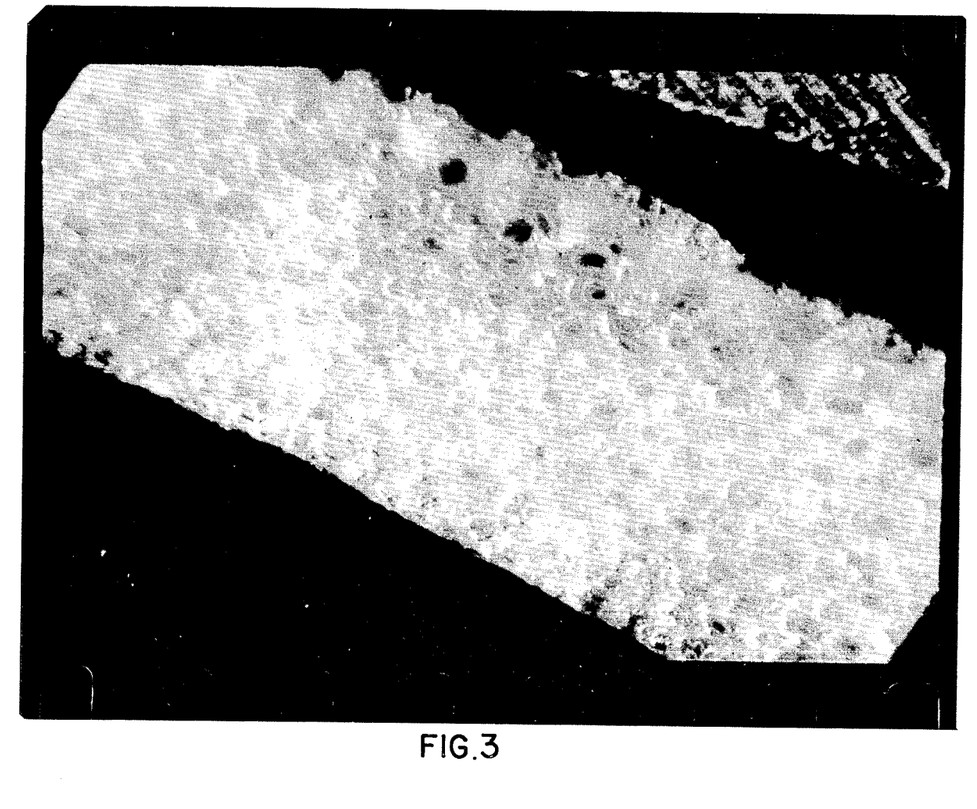
Figure 4:
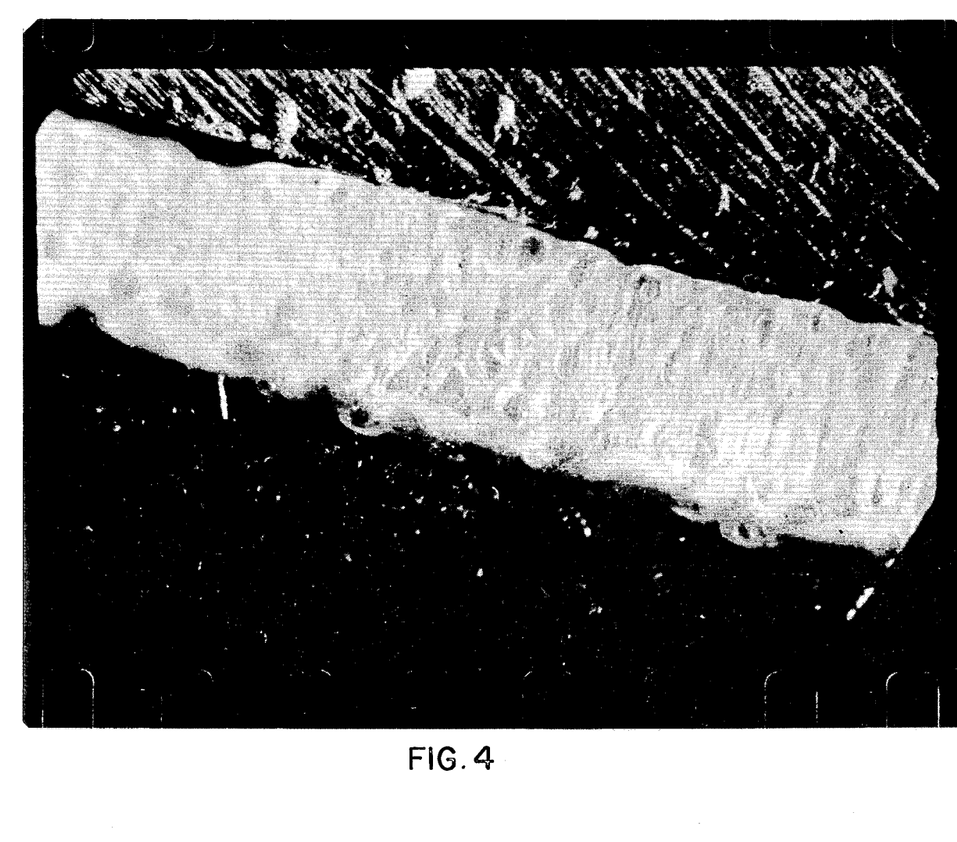
FIGS. 4 to 6 and 10 to 14 are microscopic photographs showing cells of the cross-sections of foams prepared without using said copolymer as controls.
Figure 5:
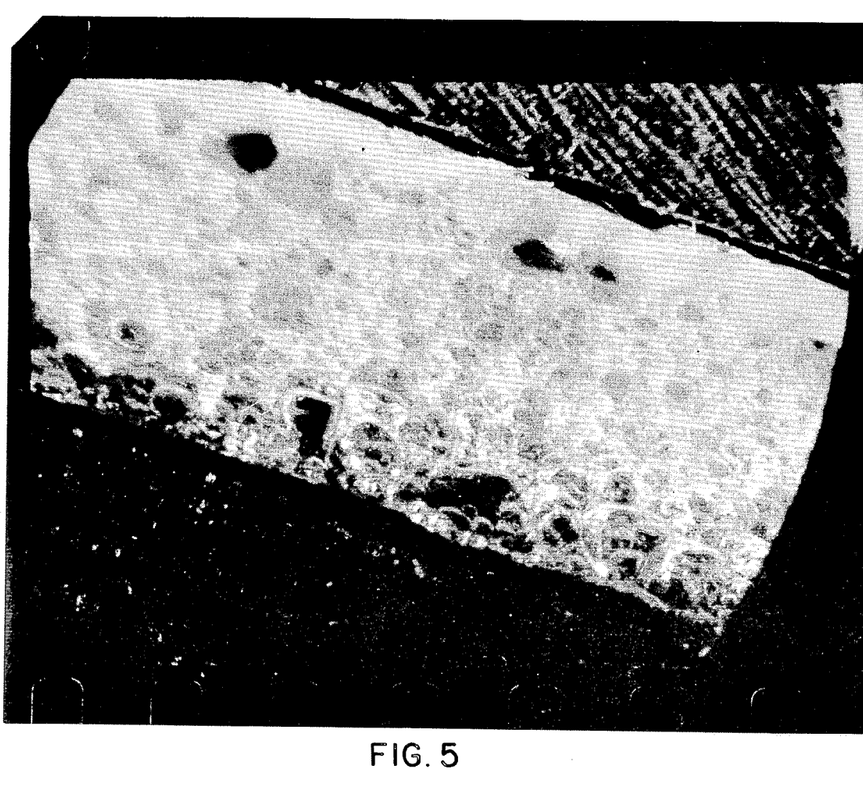
Figure 6:
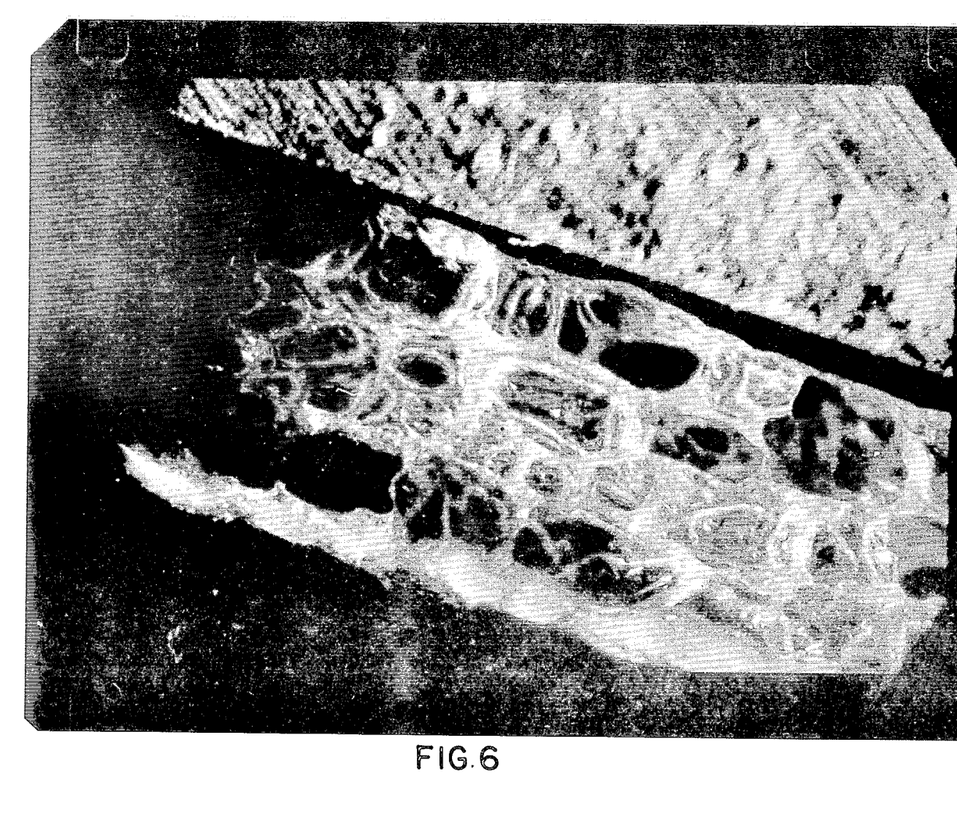

| | | Example 1 | Control 1 |
|---|---|---|---|
| Recipe | Polyvinyl chloride resin (parts) | 100 | 100. |
| | DOP (parts) | 50 | 55. |
| | DBP (parts) | 50 | 55. |
| | Vinyl acetate-ethylene copolymer (parts). | 10 | 0. |
| Foaming temperature (° C.): | | | |
| 180 | Degree of expansion in volume | 2.1 times | 2.4 times. |
| | Appearance of cells | Insufficiently expanded (see Fig. 1) | Insufficiently expanded (see Fig. 4). |
| | Appearance and touch of foams | Colorless, soft and elastic | Hard. |
| 190 | Degree of expansion in volume | 3.8 times | 3.9 times. |
| | Appearance of cells | Finely divided and uniformly distributed (see Fig. 2) | Not uniformly divided (see Fig. 5). |
| | Appearance and touch of foams | Colorless, soft and elastic | Colorless, soft and elastic. |
| 200 | Degree of expansion in volume | 4.6 times | 3.4 times. |
| | Appearance of cells | Finely divided and uniformly distributed (see Fig. 3) | Roughly divided and not uniformly distributed (see Fig. 6). |
| | Appearance and touch of foams | Colorless, soft, elastic and smooth | Colorless, hard and rough. |

As evident from the above table and the photographs in preparing the foams of the present invention, the compatibility of the each component is so good that the mixing operation is simple, the allowable range of the foaming temperature is so wide that the workability was remarkably improved and the obtained foams have finely divided and uniformly distributed cells and are soft, elastic and colorless. On the other hand, in case a liquid plasticizer is solely used as illustrated in Control 1 even if the foaming temperature is 10° C. higher or lower than the proper temperature, 190° C., the sizes and distribution of the cells are not uniform and foams are less soft and less elastic than those obtained according to the present invention.

EXAMPLE 2

A vinyl chloride resin, a vinyl acetate-ethylene copolymer of a vinyl acetate content of 52.3% and an average degree of polymerization of about 2100 and DOP as liquid plasticizer in the proportion as shown in Table 2, and dinitroso pentamethyl tetramine in an amount of 4 parts to 100 parts of the vinyl chloride resin as a foaming agent and 1.5 parts of a mixture of zinc laurate, cadmium stearate and barium stearate and 0.5 part of dibutyl tin laurate as stabilizers were blended and foams were prepared in the same manner as described in Example 1.

As controls, in each case above mentioned experiments was repeated with the exception that vinyl acetate-ethylene copolymerized resin was not employed in Control 2 and DOP and a polyester plasticizer were employed without the use of vinyl acetate-ethylene copolymer in Control 3.

The properties of these foams are shown in Table 2.

TABLE 2

Figure 7:
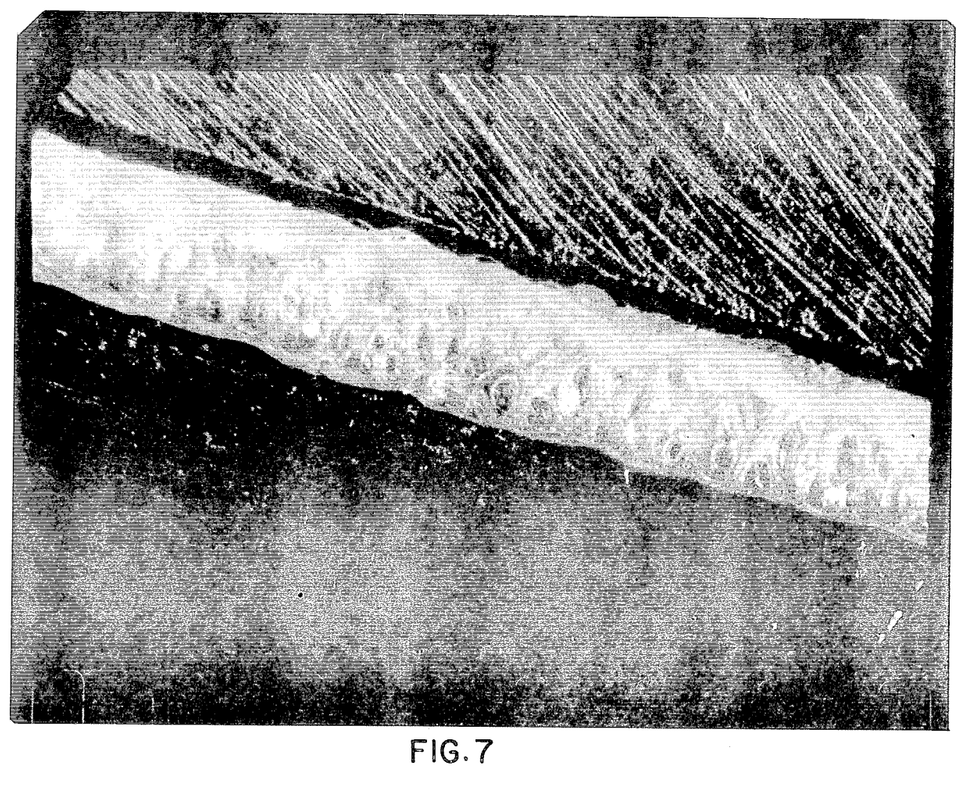
Figure 8:
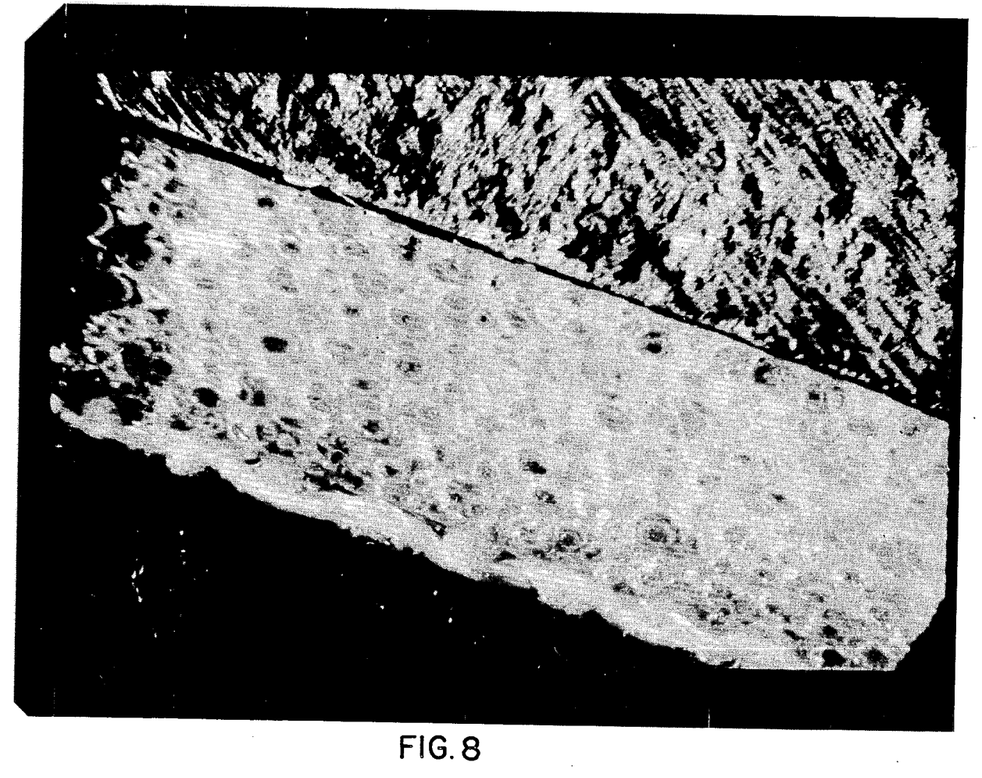
Figure 9:
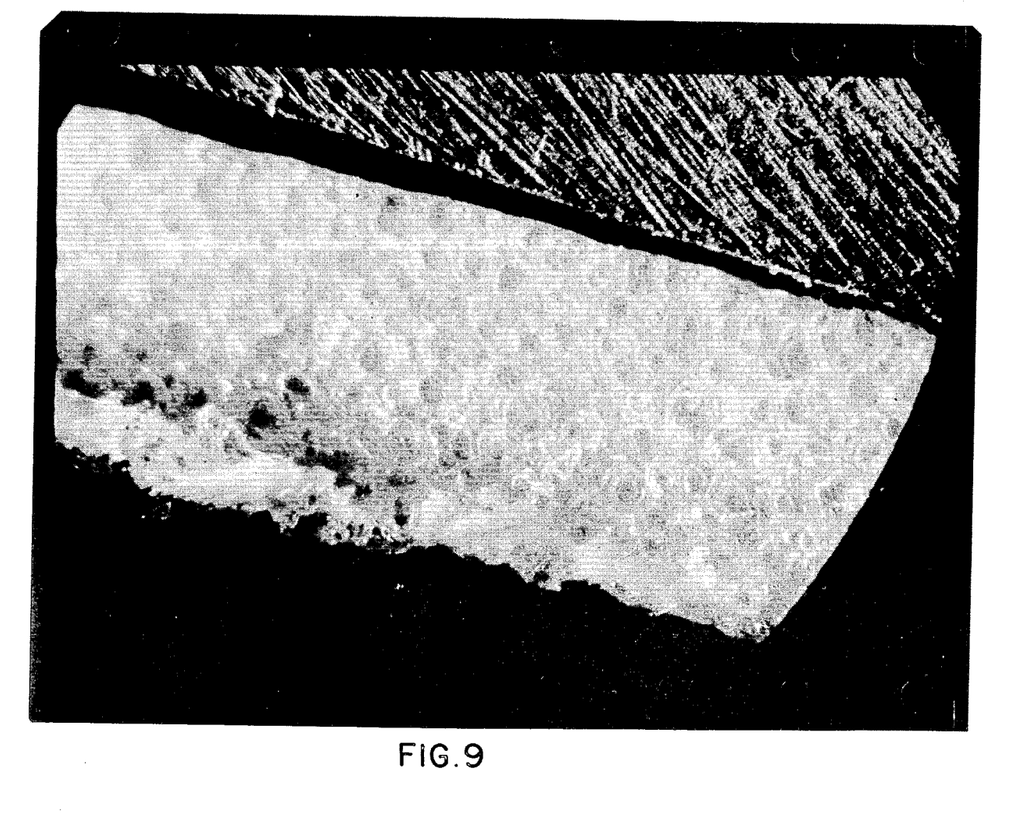
Figure 10:
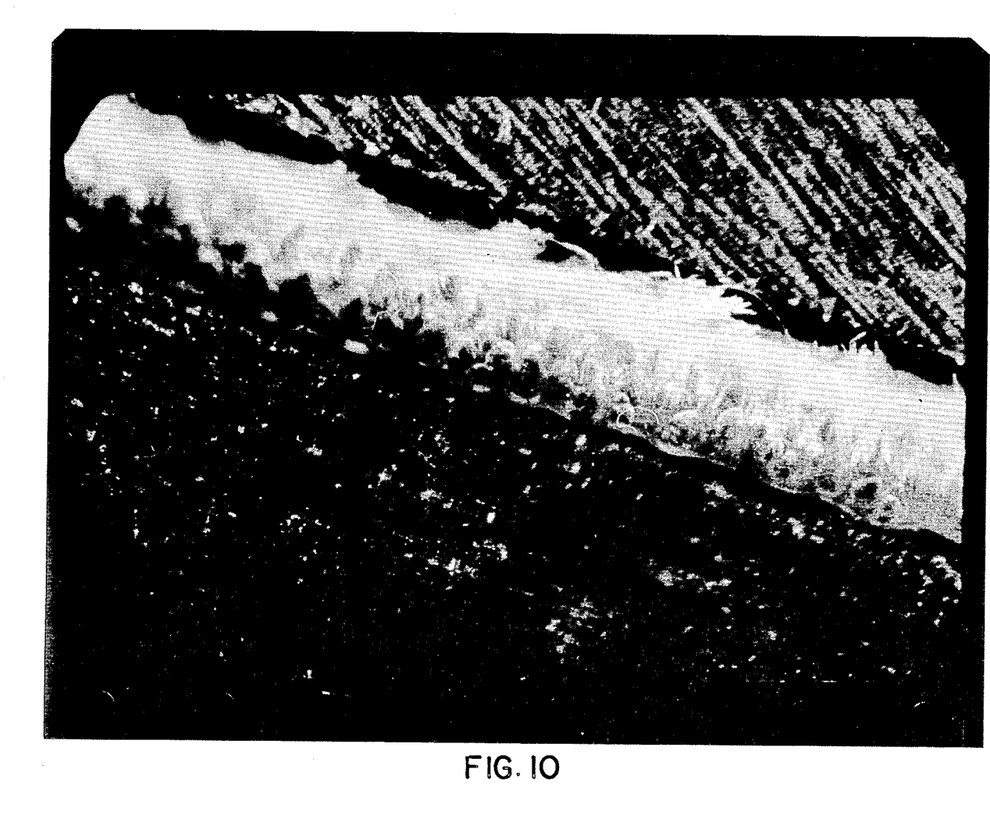
Figure 11:
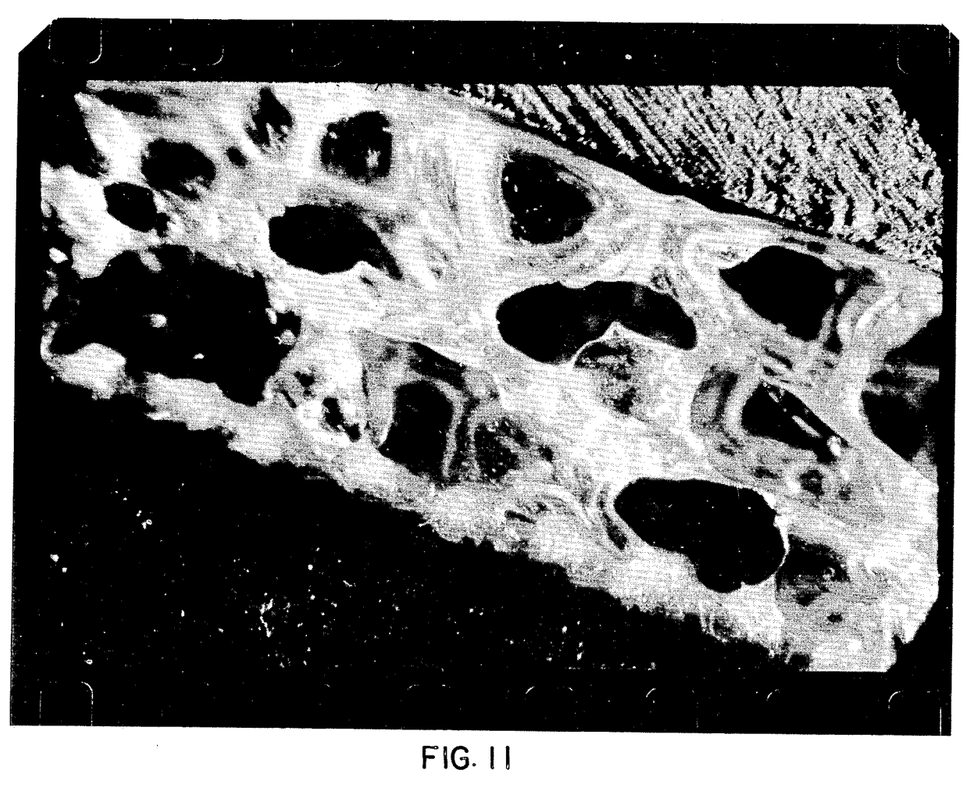
Figure 12:
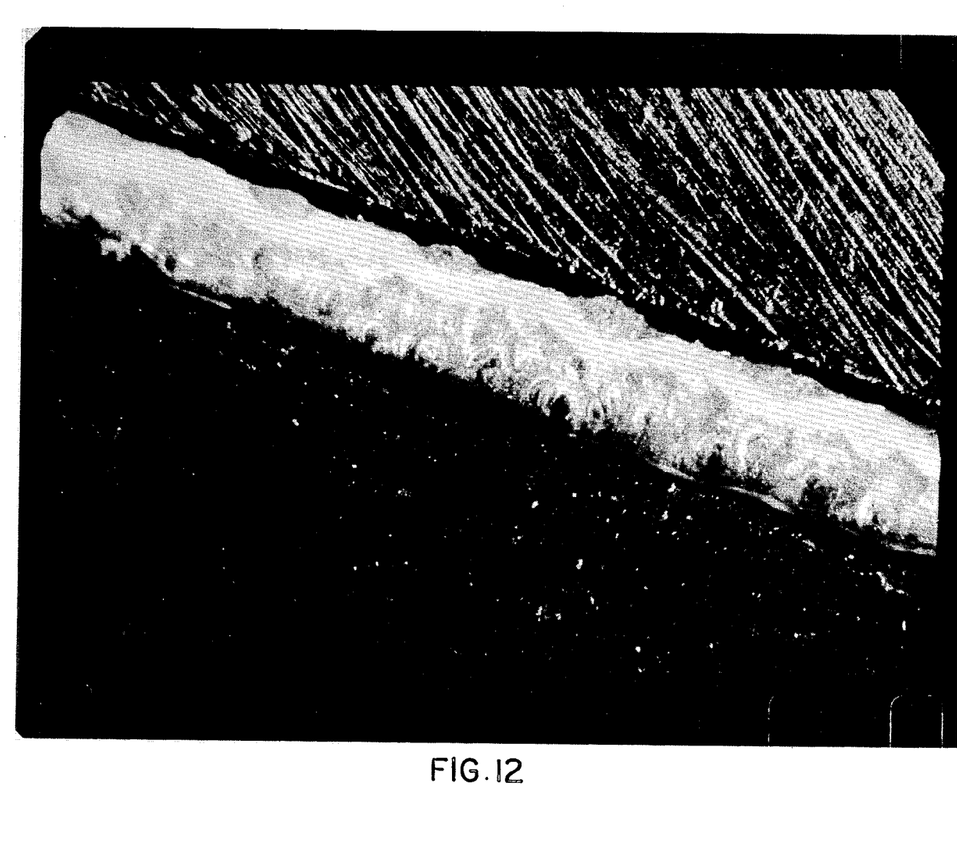
Figure 13:
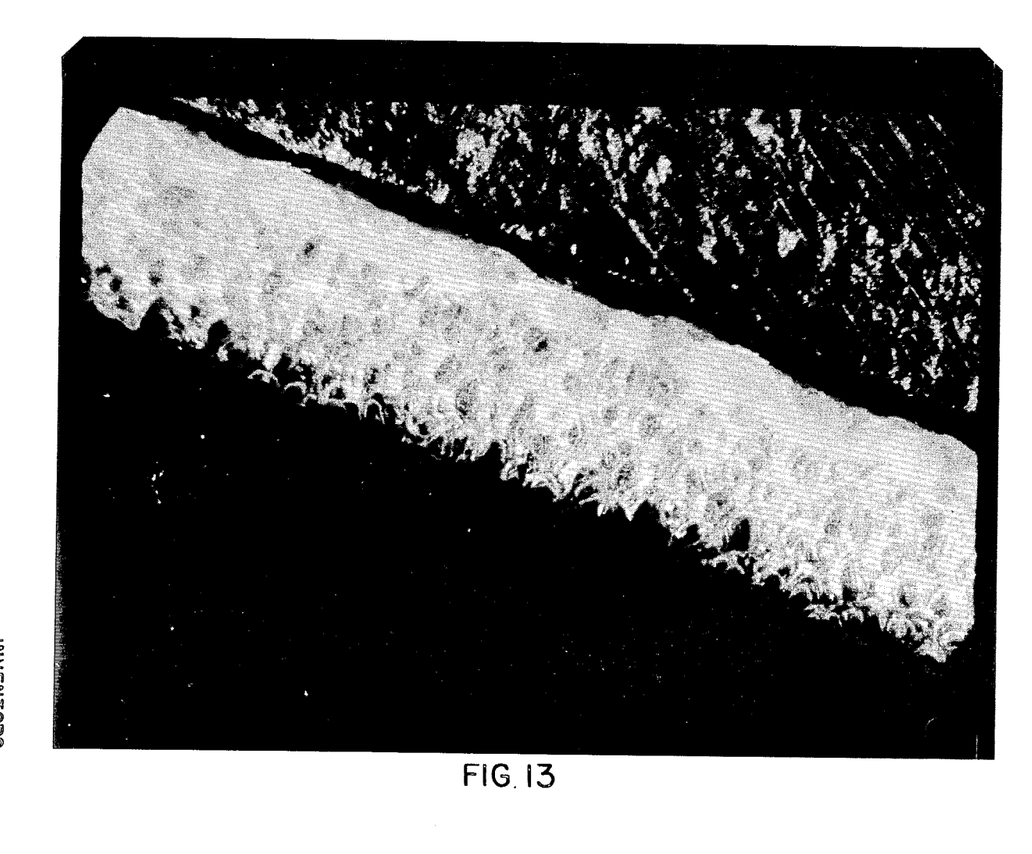
Figure 14:
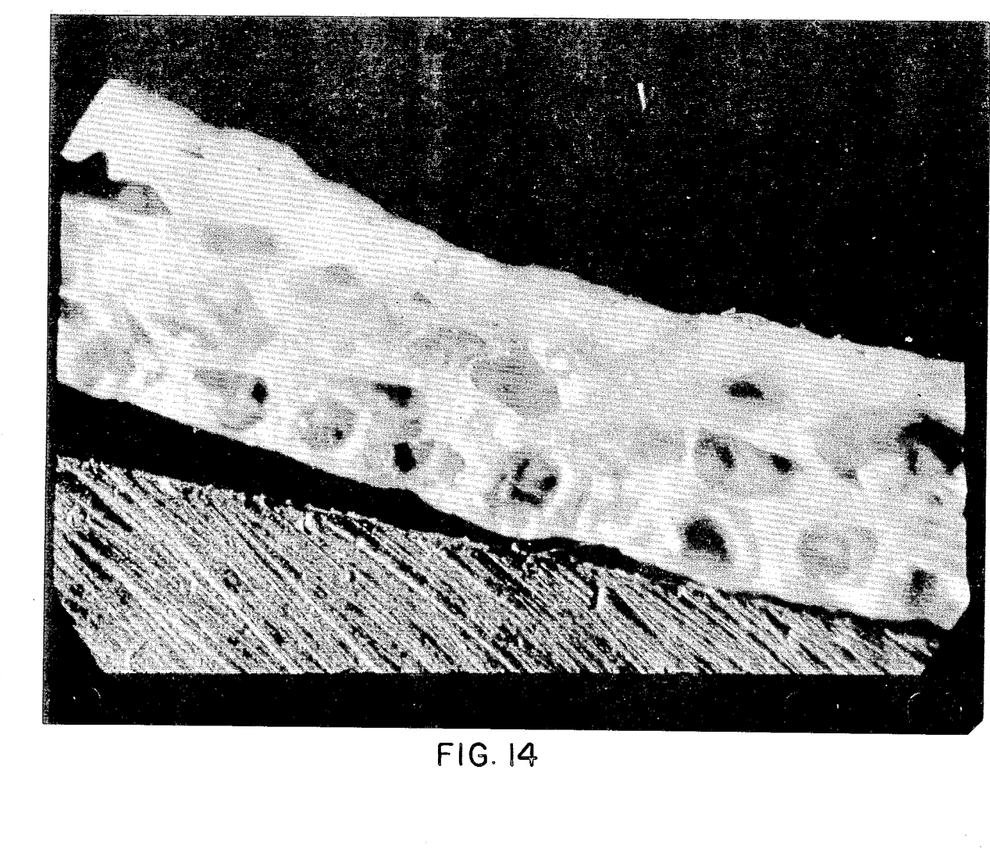

|  | | Example 2 | Control 2 | Control 3 |
|---|---|---|---|---|
| Recipe | Polyvinyl chloride resin (parts) | 100 | 100 | 100. |
| | D O P (parts) | 60 | 70 | 60. |
| | Polyester type plasticizer (parts) | 0 | 0 | 10. |
| | Vinyl acetate-ethylene copolymer (parts) | 10 | 0 | 0. |
| Foaming temperature (° C.): | | | | |
| 190 | Degree of expansion in volume | 2.4 times | 2.1 times | 1.7 times. |
| | Appearance of cells | Insufficiently expanded (see Fig. 7) | Insufficiently expanded (see Fig. 10) | Insufficiently expanded (see Fig. 12). |
| | Appearance and touch of foams | Hard | Hard and rough | Hard and not elastic. |
| 200 | Degree of expansion in volume | 3.5 times | 3.4 times | 2.6 times. |
| | Appearance of cells | Finely divided and uniformly distributed (see Fig. 8) | Roughly divided and not uniformly distributed (see Fig. 11) | Insufficiently expanded but finely divided and uniformly distributed (see Fig. 13). |
| | Appearance and touch of foams | Soft, elastic and smooth | Hard, not elastic and rough | Hard and not elastic. |
| 210 | Degree of expansion in volume | 3.8 times | Expanded into an irregular form | 3.3 times. |
| | Appearance of cells | Finely divided and uniformly distributed (Fig. 9) | Not uniformly divided | Not uniformly divided (see Fig. 14). |
| | Appearance and touch of foams | Soft, elastic and smooth | Rough, hard and elastic | Rough, hard and not elastic. |

As evident from Table 2 and the photographs, according to the present invention, even at comparatively high temperatures such as 190 to 210° C., soft and elastic foams are obtained even when the minor amount of a liquid plasticizer is employed. On the other hand, in each Control foaming was evidently unsatisfactory as the product shows insufficient expansion at 190° C., and at about 200° C. it has roughly divided and not uniformly distributed cells. The results show that the range of the proper foaming temperatures is very narrow and therefore critical.

EXAMPLES 3 TO 5

In each case, 50 parts of DBP, 50 parts of DHP, 25 parts of each vinyl acetate-ethylene copolymer as listed in Table 3 and 100 parts of polyvinyl chloride resin were mixed at a temperature of 160° C. by using a small Banbury mixer, were further mixed with 5 parts of oxybis- benzene sulfonyl hydrazide as foaming agent and 1.5 parts of a mixture of lead stearate, cadmium stearate and barium stearate as stabilizer, were molded in the form of a sheet by passing through cold rolls at 50° C. and were laminated on cloth and then were heated in an air oven at a temperature of 160° C. for 4 minutes so as to foam.

As controls, the experiment was repeated in each case with the exception that the vinyl acetate-ethylene copolymer of the vinyl acetate content of less than 30% in Control 4 or more than 80% in Control 5 was employed.

The properties of these foams are shown in Table 3.

TABLE 3

| Vinyl acetate-ethylene copolymer | Example 3 | Example 4 | Example 5 | Control 4 | Control 5 |
|---|---|---|---|---|---|
| Vinyl acetate content (percent) | 42.3 | 57.2 | 70.5 | 25 | 89.4. |
| Average degree of polymerization | 1,800 | 2,000 | 2,100 | 2,300 | 2,500. |
| Degree of expansion in volume | 3.1 times | 3.2 times | 2.9 times | 3.1 times | 2.9 times. |
| Appearance of cells | Finely divided and uniformly distributed | Finely divided and uniformly distributed | Finely divided and uniformly distributed | Roughly divided | Not uniformly distributed. |
| Appearance and touch of foams | Soft, elastic and smooth | Soft, elastic and smooth | Hard, elastic and smooth | Rough | Smooth, hard and not elastic. |

EXAMPLES 6 AND 7

Foams were prepared in the same manner as described in Example 1 except that a vinyl acetate-ethylene copolymer of the vinyl acetate content of 63.2% and the degree of polymerization of 2700 and DOP and DOA as liquid plasticizer were used in the proportion as described in Table 4 and there were added 5 parts of azodicarbonamide as foaming agent and 1 part of a mixture of zinc stearate, cadmium stearate and barium stearate as stabilizer.

As a control, the above mentioned experiment was repeated with the exception that the large amount of the vinyl acetate-ethylene copolymer was employed.

The properties of these foams are shown in Table 4.

TABLE 4

|  | | Example 6 | Example 7 | Control 6 |
|---|---|---|---|---|
| Recipe | Polyvinyl chloride resin (parts) | 100 | 100 | 100. |
| | DOP (parts) | 90 | 36 | 18. |
| | DOA (parts) | 10 | 4 | 2. |
| | Vinyl acetate ethylene copolymer (parts) | 20 | 20 | 40. |
| Foaming temperature (° C.) | | 200 | 210 | 210. |
| Degree of expansion in volume | | 3.9 times | 3.4 times | 2.5 times. |
| Appearance of cells | | Finely divided and uniformly distributed | Finely divided and uniformly distributed | Roughly divided and not uniformly distributed. |
| Appearance and touch of foams | | Soft, elastic and smooth | Soft, elastic and smooth | Hard and rough. |

What we claim is:
1. Foams of the polyvinyl chloride resin modified by both a vinyl acetate-ethylene copolymer of vinyl acetate content of 30 to 80% by weight and a liquid plasticizer; the total amount of the copolymer and the plasticizer being 30 to 150 parts by weight to 100 parts by weight of the polyvinyl chloride resin and the proportion of the copolymer to the total amount of the copolymer and the plasticizer being 3 to 60% by weight.

2. A process for preparing modified polyvinyl chloride foams which comprises blending 30 to 150 parts by weight of the total amount of a vinyl acetate-ethylene copolymer of vinyl acetate content of 30 to 80% by weight and a liquid plasticizer in the proportion of 3 to 60% by weight of the former to the total amount of both together with a foaming agent with 100 parts by weight of a polyvinyl chloride resin and heating the obtained resinous mixture up to an elevated temperature at which the foaming agent decomposes so as to be foamed.

3. Leathery sheets, lined with cloth, of the foams of the polyvinyl chloride resin described in claim 1.

References Cited

UNITED STATES PATENTS

| | | | |
|---|---|---|---|
| 2,840,534 | 6/1958 | Clark et al. | 260—2.5 |
| 3,125,545 | 3/1964 | Cleve et al. | 260—897(C) |

MURRAY TILLMAN, Primary Examiner

W. J. BRIGGS, Sr., Assistant Examiner

U.S. Cl. X.R.

161—249, 250; 260—31.8M, 897C, 899